UNITED STATES PATENT OFFICE.

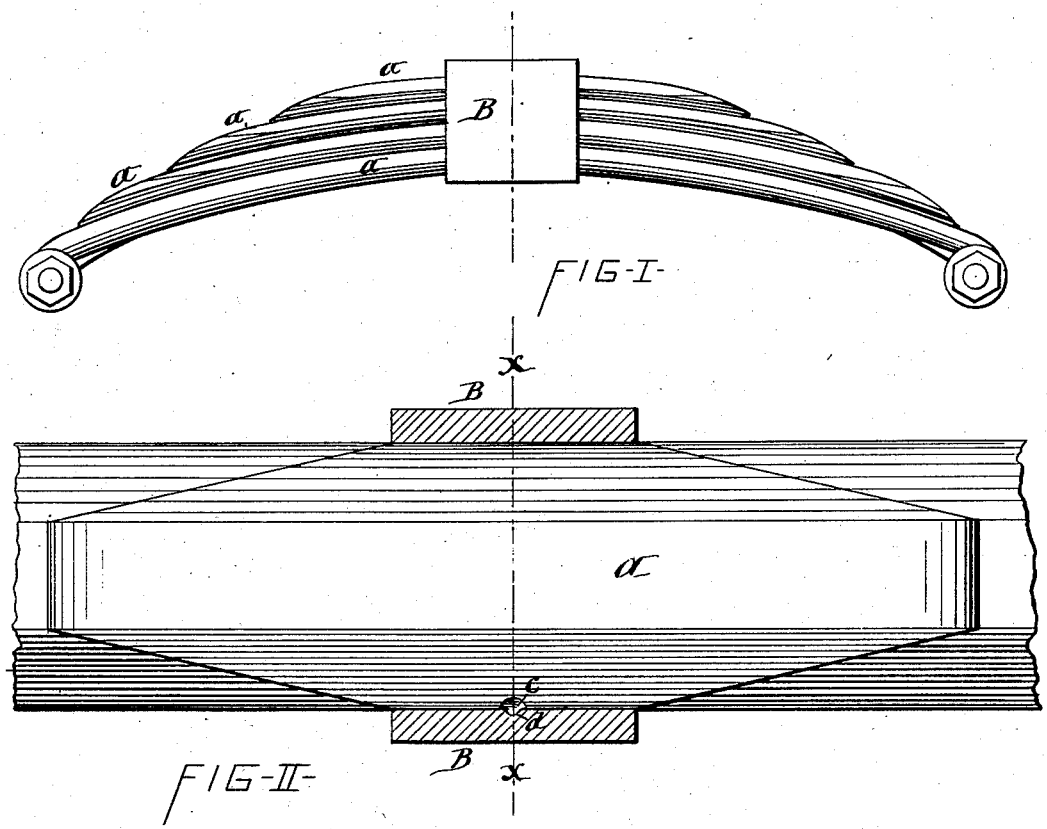

EDWARD CLIFF, OF OSWEGO, NEW YORK, ASSIGNOR TO THE CLIFF & RIGHTER COMPANY, (LIMITED,) OF SAME PLACE.

ELLIPTIC SPRING.

SPECIFICATION forming part of Letters Patent No. 304,991, dated September 9, 1884.

Application filed May 28, 1884. (No model.)

*To all whom it may concern:*

Be it known that I, EDWARD CLIFF, of Oswego, in the county of Oswego, in the State of New York, have invented new and useful Improvements in Elliptic and Analogous Springs, of which the following, taken in connection with the accompanying drawings, is a full, clear, and exact description.

This invention relates to the construction of elliptic and analogous springs, composed of leaves lying in juxtaposition one upon the other.

The invention consists, first, in forming the leaves with flat central longitudinal top and bottom surfaces, and with bevels from said surfaces to the edges of the leaf, thereby affording said leaves sufficient bearing on each other to prevent their tilting laterally, and at the same time materially reducing the friction between the leaves, and thus allowing the spring to play more freely, and, furthermore, said construction of the leaves shelters the bearing-surfaces thereof, so as to exclude the water from the same, and thus guard against corrosion; and the invention also consists in certain novel means for securing the leaves in their requisite position in relation to each other, all as hereinafter more fully described, and specifically set forth in the claims.

In the annexed drawings, Figure I is a side view of a semi-elliptic or the upper half of an elliptic spring embodying my invention. Fig. II is an enlarged horizontal section, taken immediately above the top leaf; and Fig. III is a transverse section on line $x\,x$, Fig. II.

Similar letters of reference indicate corresponding parts.

$a\,a$ represent the leaves of which the spring is composed. Said leaves I form of steel bars of uniform thickness through their length, the ends of said leaves being beveled in the usual manner, to impart to the spring a neat finish. The longitudinal central portion of the bar I maintain intact, so as to form flat central longitudinal top and bottom surfaces, by which the leaves lie contiguous one against the other. Said flat surfaces, although comparatively narrow, yet afford sufficient bearings to prevent the leaves from tilting laterally. The side portions of the leaf I taper from the central flat portion to the edges of the leaf, as best seen in Fig. III of the drawings, thereby forming water-sheds between the leaves, and by the resultant exclusion of water from the contiguous surfaces of the leaves the latter is to a great extent protected from corrosion, and thus rendered more durable.

B denotes the usual band, which embraces the central portion of the spring and serves to sustain the leaves against lateral displacement. To prevent the leaves from shifting longitudinally, I press out of the edge thereof, and thus form integral therewith, a lateral projection, $c$, and provide the inner wall of the band B with recesses $d$ for the reception of the projection $c$ of the respective leaves. The engagement of the projection $c$ with the recess $d$ serves to effectually retain the leaf in its place.

Having described my invention, what I claim as new is—

1. An elliptic or analogous spring composed of juxtaposited leaves, each of which is of uniform thickness throughout the length of its main portion, and formed with flat central top and bottom bearing-surfaces extending the length of the leaf, and with bevels from said surfaces to the edges of the leaf, and a band embracing the central portion of the leaves, substantially as described and shown.

2. In an elliptic or analogous spring composed of juxtaposited leaves, the combination of the leaves having on their edges lateral projections integral with the leaves, and a band embracing the leaves and provided in its interior with recesses for the reception of the aforesaid projections of the leaves, substantially as specified and shown.

In testimony whereof I have hereunto signed my name and affixed my seal, in the presence of two attesting witnesses, at Oswego city, in the county of Oswego, in the State of New York, this 22d day of May, 1884.

EDWARD CLIFF. [L. S.]

Witnesses:
 C. C. PLACE,
 C. C. SNOW.